2 Sheets—Sheet 1.
G. L. STEARNS.
MACHINERY FOR GRINDING FLAXSEED AND OTHER SUBSTANCES.
No. 886. Patented Aug. 18, 1838.
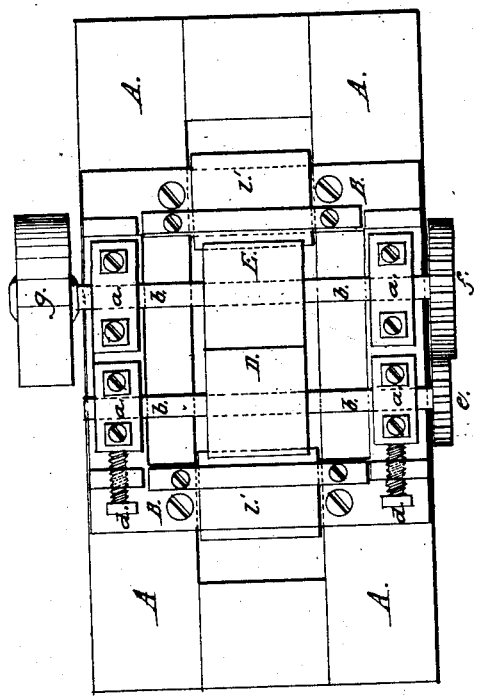
Witnesses:
R. H. Eddy
Enoch Homer
Inventor:
G. L. Stearns 2 Sheets—Sheet 2.
G. L. STEARNS.
MACHINERY FOR GRINDING FLAXSEED AND OTHER SUBSTANCES.
No. 886. Patented Aug. 18, 1838.
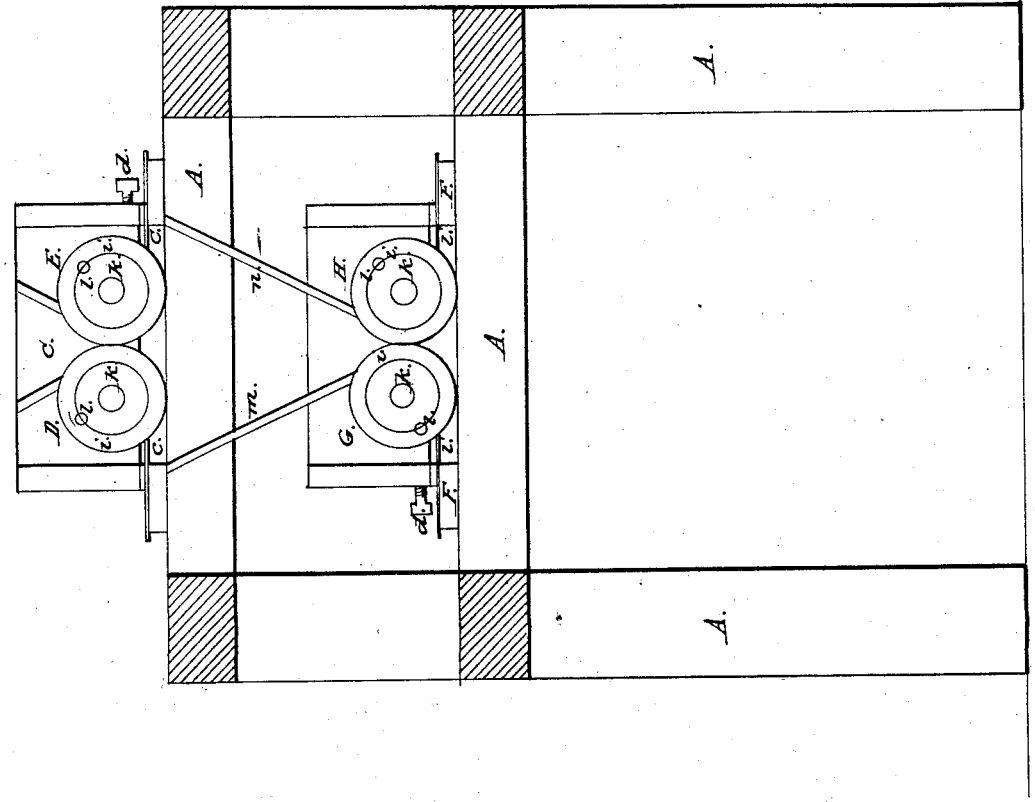
Witnesses:
R. H. Eddy
Enoch Homer
Inventor:
Geo. L. Stearns

UNITED STATES PATENT OFFICE.

GEO. L. STEARNS, OF BOSTON, MASSACHUSETTS.

MILL FOR GRINDING OR BRUISING FLAXSEED AND OTHER SUBSTANCES.

Specification of Letters Patent No. 886, dated August 17, 1838.

*To all whom it may concern:*

Be it known that I, GEORGE L. STEARNS, of Boston, county of Suffolk, and State of Massachusetts, have invented, made and applied to use a new and useful Improvement of Machinery for Grinding Flaxseed and Such other Substances as may be Advantageously Reduced by said Machinery.

The disposition, arrangement and use of the several parts of these improvements, the principle thereof and several modes in which I have contemplated the application of that principle or character by which it may be distinguished from other inventions together with those parts, improvements, or combinations I claim as my inventions or discoveries I have fully set forth and described in the following specification and accompanying drawings.

Plate 1, represents a top view or plan of my machine, and Plate 2 is a vertical section thereof through the middle.

A, A, is a strong frame of wood or metal shaped as seen in the drawings or otherwise formed to answer its purpose of supporting the parts of the machinery. On the top plate of this frame is fixed by bolts or otherwise, another frame of iron B, B, which serves to sustain the boxes $a, a, a, a$ of the journals $b, b, b, b$ of two metallic rollers D, E whose circumferences bear against each other or are fixed a small distance apart—the same being regulated by the screws $d\ d$. On the end of the axis of one of the cylinders or rolls is a cogged wheel or pinion $e$, of suitable size which plays into another cogged wheel $f$ on the end of the axis of the roller E. To the opposite extremity of the axis or shaft of the last mentioned roller a pulley $g'$ is affixed to be driven by a belt proceeding from a drum turned by any suitable power. The diameter of one of the cogged wheels $e$ is rather less than that of the other in order that the sphere of its cylinder or roll may be greater than that of the other cylinder, the reason of the same being to bruise or grind the flax seed as it passes between the rolls. Over the rolls a hopper C is fixed in a suitable manner to feed the seed between them as it is ground. Immediately underneath and parallel to the above set of rolls, is another frame F, F, and set of rolls G, H of similar construction turned and operated by a belt passing over its pulley in the same manner. As the seed passes through or between the first set of rolls, it drops into the hopper over the second set and is operated on and ground still finer by the same.

Against the edge of each roller is a scraper $l'$ of metal, which prevents the seeds that adhere to the surface of the cylinders from passing over again between them, and causes them to drop downward either between the lower rollers or to a proper trough placed underneath the machine to catch the same after being ground or operated on. The side planes $m, n$, serve to convey the seeds between the second set of rolls after they have passed through the first. It will be obvious that I may make use of a third or fourth set of rolls, to grind the seed still finer should it be desirable.

The rollers D, E, G, H are constructed so that when they become worn or injured the outer cylinder $i, i, i, i$, may be removed or taken off the inner cylinder $k$, and another substituted and confined thereon by a key or pin $l$.

In the above machine I shall claim—

The mode of grinding flax seed or other substances that may be reduced therein by cylinders or rollers, constructed, placed and operated as I have herein above described.

In testimony that the above is a true specification of my said inventions and improvements I have hereunto set my hand this tenth day of April in the year of our Lord eighteen hundred and thirty seven.

GEO. L. STEARNS. [L. S.]

Witnesses:
R. H. EDDY,
ENOCH HOMER.